(12) United States Patent
Knobloch et al.

(10) Patent No.: US 8,101,679 B2
(45) Date of Patent: Jan. 24, 2012

(54) PROCESSING STABILIZERS FOR RUBBER COMPOUNDING

(75) Inventors: Gerrit Knobloch, Magden (CH); Eva Peregi, Huningue (FR); Pierre Rota-Graziosi, Mulhouse (FR)

(73) Assignee: BASF SE, Ludwigshafen (DE)

( * ) Notice: Subject to any disclaimer, the term of this patent is extended or adjusted under 35 U.S.C. 154(b) by 42 days.

(21) Appl. No.: 12/531,514

(22) PCT Filed: Mar. 10, 2008

(86) PCT No.: PCT/EP2008/052801
§ 371 (c)(1),
(2), (4) Date: Jan. 4, 2010

(87) PCT Pub. No.: WO2008/113702
PCT Pub. Date: Sep. 25, 2008

(65) Prior Publication Data
US 2010/0130660 A1    May 27, 2010

(30) Foreign Application Priority Data

Mar. 21, 2007  (EP) .................... 07104544

(51) Int. Cl.
C08K 5/375    (2006.01)
C08K 5/103    (2006.01)
C08L 21/00    (2006.01)

(52) U.S. Cl. .......... 524/330; 524/284; 524/331

(58) Field of Classification Search .............. 524/330, 524/284, 331
See application file for complete search history.

(56) References Cited

U.S. PATENT DOCUMENTS

| 4,857,572 | A | * | 8/1989 | Meier et al. ............ 524/289 |
| 5,276,258 | A | * | 1/1994 | Knobloch et al. ........... 524/114 |
| 5,391,610 | A |   | 2/1995 | Comert et al. |
| 6,174,991 | B1 |   | 1/2001 | Steiger |
| 6,365,781 | B2 |   | 4/2002 | Pizzoli et al. |
| 2006/0183831 | A1 |   | 8/2006 | Hsu et al. |
| 2008/0275184 | A1 |   | 11/2008 | Karato et al. |

FOREIGN PATENT DOCUMENTS

| EP | 0 224 442 A1 | 6/1987 |
| EP | 1 661 946 A1 | 5/2006 |
| WO | 98/29457 A1 | 7/1998 |

* cited by examiner

Primary Examiner — Kelechi Egwim
(74) Attorney, Agent, or Firm — Tyler A. Stevenson

(57) ABSTRACT

The invention describes an improved method for the preparation of rubber compounds which comprises compounding the rubber and the components at 125-200° C. in the presence of an amount of 0.1-2% based on the weight of the rubber of a processing stabilizer of the formula (I) wherein $R_1$ is hydrogen, $C_1$-$C_{20}$alkyl, styryl, α-methyl-styryl or —$CH_2$—S—$R_3$; or $C_1$-$C_{20}$alkyl substituted with $C_2$-$C_{20}$alkenyl, $C_3$-$C_{20}$alkinyl, $C_5$-$C_9$cycloalkyl, phenyl or tolyl; $R_2$ is $C_1$-$C_{20}$alkyl or —$CH_2$—S—$R_3$, $R_3$ is $C_1$-$C_{20}$alkyl; with phenyl, hydroxyl, cyano, formyl, acetyl or —O—CO—$R_5$ substituted $C_1$-$C_{20}$alkyl; $C_2$-$C_{20}$alkenyl, $C_3$-$C_{20}$alkinyl, $C_5$-$C_9$cycloalkyl; or with hydroxyl, phenyl, 4-chloro-phenyl, 2-methoxycarbonylphenyl, p-tolyl, 1,3-benzthiazol-2-yl, —(CHR$_5$)COOR$_6$ or —(CHR$_5$)$_n$CONR$_7$R$_8$ substituted $C_5$-$C_9$cycloalkyl; $R_4$ is hydrogen or methyl, $R_5$ is hydrogen or $C_1$-$C_6$alkyl, $R_6$ is $C_1$-$C_{20}$alkyl; with oxygen or sulfur interrupted $C_3$-$C_{20}$alkyl; $C_5$-$C_9$cycloalkyl, phenyl, benzyl or tolyl, $R_7$ and $R_8$ are independently of each other hydrogen or $C_1$-$C_6$alkyl, and n is 1 or 2.

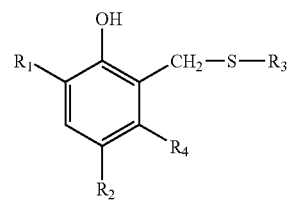

(I)

5 Claims, No Drawings

PROCESSING STABILIZERS FOR RUBBER COMPOUNDING

The present invention relates to an improved method for the preparation of rubber compounds which comprises compounding the rubber and the components at 125-200° C. in the presence of 0.1-2% based on the weight of the rubber of a specific group of sulfur-containing processing stabilizers.

There are no specific processing stabilizers for rubber compounding on the market even though processing problems exist. It is partly believed that the anti-degradants used for the stabilization of the vulcanizate provide processing stability. However, their performance as processing stabilizer is very limited.

It has now been found that a very specific group of sulfur-containing stabilizers are especially useful for rubber compounding at 125-200° C.

The present invention therefore provides an improved method for the preparation of rubber compounds which comprises compounding the rubber and the components at 125-200° C. in the presence of an amount of 0.1-2% based on the weight of the rubber of a processing stabilizer of the formula I

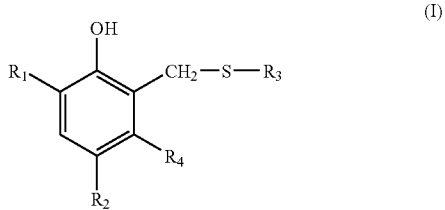

(I)

wherein
$R_1$ is hydrogen, $C_1$-$C_{20}$alkyl, styryl, α-methyl-styryl or —$CH_2$—S—$R_3$; or $C_1$-$C_{20}$alkyl substituted with $C_2$-$C_{20}$alkenyl, $C_3$-$C_{20}$alkinyl, $C_5$-$C_9$cycloalkyl, phenyl or tolyl;
$R_3$ is $C_1$-$C_{20}$alkyl; with phenyl, hydroxyl, cyano, formyl, acetyl or O—CO—$R_5$ substituted $C_1$-$C_{20}$alkyl; $C_2$-$C_{20}$alkenyl, $C_3$-$C_{20}$alkinyl, $C_5$-$C_9$cycloalkyl; or with hydroxyl, phenyl, 4-chlorophenyl, 2-methoxycarbonylphenyl, p-tolyl, 1,3-benzthiazol-2-yl, —(CHR$_5$)$_n$COOR$_6$ or —(CHR$_5$)$_n$CONR$_7$R$_8$ substituted $C_5$-$C_9$cycloalkyl;
$R_4$ is hydrogen or methyl,
$R_5$ is hydrogen or $C_1$-$C_6$alkyl,
$R_6$ is $C_1$-$C_{20}$alkyl; with oxygen or sulfur interrupted $C_3$-$C_{20}$alkyl; $C_5$-$C_9$cycloalkyl, phenyl, benzyl or tolyl,
$R_7$ and $R_8$ are independently of each other hydrogen or $C_1$-$C_6$alkyl, and
n is 1 or 2.

Alkyl having up to 20 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

$C_2$-$C_{20}$alkenyl radicals are, for example, vinyl, allyl(prop-2-enyl), but-3-enyl, pent-4-enyl, hex-5-enyl, oct-7-enyl, dec-9-enyl or dodec-11-enyl.

$C_3$-$C_{20}$alkinyl radicals are, for example, propargyl, but-3-inyl, hex-5-inyl, oct-7-inyl, dec-9-inyl, dodec-11-inyl, tetradec-13-inyl, hexadec-15-inyl, octadec-17-inyl or eicos-19-inyl.

$C_5$-$C_9$cycloalkyl radicals are, for example, cyclopentyl, cyclohexyl, cycloheptyl, cyclooctyl, cyclononyl, and in particular cyclohexyl.

$C_1$-$C_{20}$alkyl radicals substituted with phenyl are, for example, benzyl, phenethyl, α-methylbenzyl, α,α-dimethylbenzyl, phenylbutyl, phenyl-α,α-dimethylpropyl, phenylhexyl, phenyl-α,α-dimethylbutyl, phenyloctyl or phenyl-α,α-dimethylhexyl.

$C_1$-$C_{20}$alkyl radicals substituted by one or two hydroxyl groups are, for example, 2-hydroxyethyl, 2-hydroxypropyl, 2-hydroxybutyl, 2-hydroxyhexyl, 2-hydroxyoctyl, 2-hydroxydecyl, 2-hydroxydodecyl, 2-hydroxytetradecyl, 2-hydroxyhexadecyl, 2-hydroxyoctadecyl, 2-hydroxyeicosyl or 2,3-dihydroxypropyl.

$C_1$-$C_{20}$alkyl radicals substituted by phenyl and hydroxy are, for ex. 1-phenyl-2-hydroxyethyl. $C_1$-$C_{20}$alkyl radicals substituted by cyano are, for example, 2-cyanoethyl.

$C_3$-$C_{20}$alkyl interrupted by one to five oxygen or sulfur are, for example, 3-oxapropyl, 3-thiapropyl, 3-oxabutyl, 3-thiabutyl, 3-oxapentyl, 3-thiapentyl, 3,6-dioxaheptyl, 3,6,9-trioxadecyl or 3,6,9,12,15,18 hexaoxanonadecyl.

An interesting improved method for the preparation of rubber compounds comprises a compound of the formula I, wherein $R_3$ is $C_6$-$C_{18}$alkyl.

A preferred improved method for the preparation of rubber compounds comprises a compound of the formula I, wherein
$R_1$ is methyl,
$R_2$ is —$CH_2$—S—$R_3$,
$R_3$ is $C_8$-$C_{12}$alkyl, and
$R_4$ is hydrogen.

Particular preference is given to an improved method for the preparation of rubber compounds which comprises as a compound of the formula I, a compound of the formula A1 or A2.

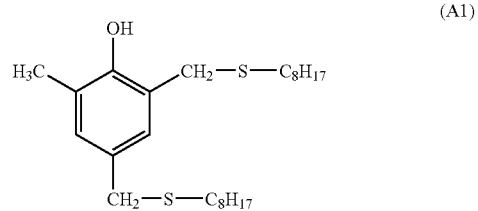

(A1)

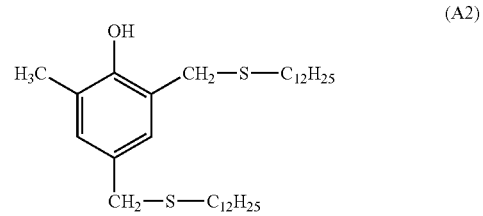

(A2)

The compounds of the formula A1 and A2 are commercially available as for example Irganox 1520® and Irganox 1726® [available from Ciba Specialty Chemicals Inc.].

The preparation of the compounds of the formula I are disclosed for example in U.S. Pat. No. 6,365,781 B2 and can be prepared by methods known in the art as disclosed for example in the above mentioned reference.

Rubbers are to be understood as meaning macromolecular materials which after considerable deformation under a small load at room temperature rapidly regain approximately their original shape. See also Hans-Georg Elias, "An Introduction to Polymer Science", Section 12. "Elastomers", pp. 388-393, 1997, VCH Verlagsgesellschaft mbH, Weinheim, Germany or "Ullmann's Encyclopedia of Industrial Chemistry, fifth, completely revised edition, Volume A 23", pp. 221-440 (1993).

Examples of rubbers which may be present in the method of the invention are the following materials:

1. Polymers of conjugated dienes, for example polybutadiene or polyisoprene.
2. Copolymers of mono- and diolefins with one another or with other vinyl monomers, e.g. propylene-isobutylene copolymers, propylene-butadiene copolymers, isobutylene-isoprene copolymers, ethylene-alkyl acrylate copolymers, ethylene-alkyl methacrylate copolymers, ethylene-vinyl acetate copolymers, acrylonitrile-butadiene copolymers, and also terpolymers of ethylene with propylene and with a diene, such as hexadiene, dicyclopentadiene or ethylidenenorbornene.
3. Copolymers of styrene or α-methylstyrene with dienes or with acrylic derivatives, e.g. styrene-butadiene, styrene-butadiene-isoprene, styrene-butadiene-alkyl acrylate and styrene-butadiene-alkyl methacrylate; block copolymers of styrene, e.g. styrene-butadiene-styrene, styrene-isoprene-styrene and styrene-ethylenebutylene-styrene.
4. Halogen-containing polymers, e.g. polychloroprene, chlorinated rubber, chlorinated or brominated copolymers of isobutylene-isoprene (halobutyl rubber), halogenated copolymers of isobutylene and p-methylstyrene.
5. Natural rubber.
6. Aqueous emulsions of natural or synthetic rubbers, e.g. natural rubber latex or latices of carboxylated styrene-butadiene copolymers.

Preferably, the rubber component is based on highly unsaturated rubbers such as, for example, natural rubber and/or styrene-butadiene rubber and/or butadiene rubber. Representative of the highly unsaturated polymers that can be employed in the practice of this invention are diene rubbers. Such rubbers will ordinarily possess an iodine number of between about 20 to about 450, although highly unsaturated rubbers having a higher or a lower (e.g. of 50-100) iodine number can also be employed. Illustrative of the diene rubbers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example styrene, α-methylstyrene, acetylene, e.g. vinyl acetylene, acrylonitrile, methacrylate, methyl acrylate, ethyl acrylate, methyl methacrylate, ethyl methacrylate, vinyl acetate, and the like. Preferred highly unsaturated rubbers include natural rubber, cis-polyisoprene, polybutadiene, poly(styrene-butadiene), styrene-isoprene copolymers, isoprene-butadiene copolymers, styrene-isoprene-butadiene tripolymers, polychloroprene, chloro-isobutene-isoprene, nitrile-chloroprene, styrene-chloroprene, and poly(acrylonitrile-butadiene). Moreover, mixtures of two or more highly unsaturated rubbers with elastomers having lesser unsaturation such as EPDM, EPR, butyl or halogenated butyl rubbers are also within the contemplation of the invention.

The compound of the formula I is usefully added to the rubber to be compounded in amounts of from 0.1 to 2%, for example from 0.1 to 1.5%, preferably from 0.2 to 1.5%, based on the weight of the rubber to be compounded.

In addition to the compound of the formula I, the method of the invention may comprise other additives, such as the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.3. Tocopherols, for example α-tocopherol, β-tocopherol, γ-tocopherol, δ-tocopherol and mixtures thereof (vitamin E).

1.4. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.5. Alkylidenebis- and polyphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-α-methylbenzyl)-4-nonylphenol], 2,2'-methylenebis[6-(α,α-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane, butylated reaction product of p-cresol and dicyclopentadiene.

1.6. O-, N- and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.7. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4- hydroxybenzyl)malonate, bis[4-(1,1,3,3-tetramethylbutyl) phenyl]-2,2-bis(3,5-di-tert-butyl-4-hydroxybenzyl) malonate.

1.8. Aromatic hydroxybenzyl compounds, for example 1,3, 5-tris(3,5-di-tert-butyl-4-hydroxybenzyl)-2,4,6-trimethylbenzene, 1,4-bis(3,5-di-tert-butyl-4-hydroxybenzyl)-2,3,5, 6-tetramethyl benzene, 2,4,6-tris(3,5-di-tert-butyl-4-hydroxybenzyl)phenol.

1.9. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyisocyanurate, 2,4, 6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzypisocyanurate.

1.10. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.11. Acylaminophenols, for example 4-hydroxylauranilide, 4-hydroxystearanilide, octyl N-(3,5-di-tert-butyl-4-hydroxyphenyl)carbamate.

1.12. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, evelinlene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.14. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide.

1.17. Ascorbic acid (vitamin C)

1.18. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis (1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

1.19. Quinoline derivatives, for example polymerized 2,2,4-trimethyl-1,2-dihydroquinoline, 6-ethoxy-2,2,4-trimethyl-1, 2-dihydroquinoline.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy) carbonylethyl]-2'-hydroxyphenyl)-5-chlorobenzotriazole, 2-(3'-tert-butyl-2'-hydroxy-5'-(2-methoxycarbonylethyl) phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)

phenylbenzotriazole, 2,2'-methylenebis[4-(1,1,3,3-tetramethylbutyl)-6-benzotriazole-2-yl phenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-6,6-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethyl-piperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis (3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)-hexamethylenediamine, a diester of 4-methoxymethylenemalonic acid with 1,2,2,6,6-pentamethyl-4-hydroxypiperidine, poly [methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2- hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergistic compounds, for example thiodipropionic acid dilauryl ester or thiodipropionic acid distearyl ester or compounds of formula IV

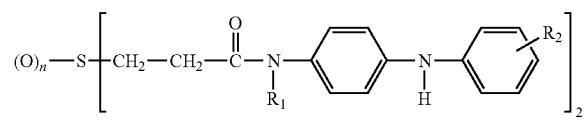
(IV)

wherein
$R_1$ is hydrogen, $C_1$-$C_{12}$alkyl, cyclohexyl, phenyl or benzyl,
$R_2$ is hydrogen or $C_1$-$C_4$alkyl, and
n is the number 0, 1 or 2.

8. Peroxide scavengers, for example esters of 6-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(6-dodecylmercapto)propionate.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Fillers and reinforcing agents, for example calcium carbonate, silicates, glass fibres, glass beads, talc, kaolin, mica, barium sulfate, metal oxides and hydroxides, carbon black, graphite, wood flour and flours or fibers of other natural products, synthetic fibers 11. Other additives, for example plasticisers, lubricants, emulsifiers, pigments, rheology additives, catalysts, flow-control agents, optical brighteners, flameproofing agents, antistatic agents and blowing agents.

12. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839; EP-A-0591102 or EP-A-1291384 or 3-[4-(2-acetoxyethoxy)phenyl]-5,7-di-tert-butyl benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butyl benzofuran-2-one or 3-(2-actyl-5-isooctylphenyl)-5-isoocylbenzofuran-2-one.

A preferred process of the invention comprises, as other additives, one or more components selected from the group consisting of pigments, dyes, fillers, levelling assistants, dispersants, plasticizers, vulcanization activators, vulcanization accelerators, vulcanizers, charge control agents, adhesion promoters, antistatic agents, metal oxides, antioxidants and light stabilizers, such as phenolic antioxidants (items 1.1 to 1.17 in the list) or aminic antioxidants (item 1.18 in the list), organic phosphites or phosphonites (item 4 in the list), thiosynergists (item 7 in the list) and/or benzofuranones (item 12 in the list).

Preferably, the component is an epoxidised soybean oil and/or 2,2,6,6-tetramethylpiperidine-1-oxyl (TEMPO). The latter is a free radical.

Preferably, the weight ratio of the compound of the formula I to the component, for example the epoxidised soybean oil, is 99.5:0.5 to 10:90. A preferred weight ration of compound of the formula I to the 2,2,6,6-tetramethylpiperidine-1-oxyl (TEMPO) is 2:1 to 1:2.

An example of the concentrations at which these other additives are added is from 0.01 to 10%, based on the total weight of the rubber to be compounded.

The compounds of the formula I, and also, if desired, other additives are incorporated into the rubber in one-step or multi-step, for example during mixing in internal mixers with rams (Banbury), on mixing rolls or in mixing extruders, prior to vulcanization. When added to the rubber, the compounds of the formula I and, if desired, other additives may also be in the form of a masterbatch comprising these, for example at a concentration of from 2.5 to 25% by weight.

The resultant compounded rubber may be used in a wide variety of forms, e.g. ribbons, moulding compositions, profiles, conveyor belts or tyres. The final forms are then vulcanized (crosslinking of the rubber).

Preferably, the compounding of the rubber together with the components takes place at 125-200° C., for example between 150-200° C., most preferably at 150-160° C.

A further embodiment of the present invention is the use of the compounds of the formula I as processing stabilizers for rubber compounding at 125-200° C.

The following examples illustrate the invention further. Parts or percentages relate to weight.

EXAMPLE 1

Preparation of Silica Filled Rubber Compound

Recipe (see Table 1):

TABLE 1

| Rubber/Component | Parts by weight | Type of Chemical | Supplier |
|---|---|---|---|
| S-SBR Buna VSL 5025-0 | 75 | Rubber | Lanxess |
| BR Buna CB 527 T | 25 | Rubber | Lanxess |
| Ingralen 450 | 33 | Extender oil | Fuchs/Mannheim |
| Ultrasil VN3 | 80 | Filler | Degussa |
| Zinc oxide | 2.5 | Activator | |
| Stearic acid | 1.0 | Activator | |
| Antilux 110 | 1.5 | Wax | Lanxess |

The ingredients are mixed in the usual manner in a Haake laboratory mixer using a 450 ml mixing head. In the Example according to the invention additionally 0.5 parts by weight of a processing stabilizer [Irganox 1520®; Example 1b] is added. The mixer temperature is 125° C., the rotor speed 75 rpm, the fill factor 70% and the total mixing time 20 minutes. The Mooney viscosity MS1+4(100) of the basic mixtures is measured according to the corresponding ASTM Standard. The results are summarized in Table 2. Lower Mooney viscosity indicates less oxidative crosslinking due to better processing stability.

TABLE 2

| Example | Processing Stabilizer | Mooney viscosity MS1 + 4(100) |
|---|---|---|
| 1a[a)] | None | 84 |
| 1b[b)] | 0.5 parts of Irganox 1520[c)] | 62 |

See explanation of footnotes at the end of Table 9.

EXAMPLE 2

Preparation of a Silica Filled Rubber Compound Containing Silane Coupling Agent

Silane coupling agents are used in many silica filled rubber compounds in order to modify mechanical properties, particularly in tire tread compounds. Good processing stability is essential to avoid oxidative crosslinking which results in viscosity increase and subsequent temperature raise. Temperature control is very important to avoid undesirable "silane scorch", which would lead to a further viscosity increase because of the premature formation of chemical bonds between silica and rubber chains.

Recipe (see Table 3):

TABLE 3

| Rubber/Component | Parts by weight | Type of Chemical | Supplier |
|---|---|---|---|
| S-SBR Buna VSL 5025-0 | 75 | Rubber | Lanxess |
| BR Buna CB 527 T | 25 | Rubber | Lanxess |
| Ingralen 450 | 33 | Extender oil | Fuchs/Mannheim |
| Ultrasil VN3 | 80 | Filler | Degussa |
| Zinc oxide | 2.5 | Activator | |
| Stearic acid | 1.0 | Activator | |
| Antilux 110 | 1.5 | Wax | Lanxess |
| Silane 69 | 6.0 | Coupling agent | Degussa |

The ingredients are mixed in the usual manner in a Haake laboratory mixer using a 450 ml mixing head. In the Example according to the invention additionally 0.5 parts by weight of a processing stabilizer [Irganox 1520®]. In comparison Example 2b, instead of Irganox 1520, 2.0 parts by weight of Vulkanox 4020® is additionally added. The mixer temperature is 125° C., the rotor speed 75 rpm, the fill factor 70% and the total mixing time 20 minutes. The Mooney viscosity MS1+4(100) of the basic mixtures is measured according to the corresponding ASTM Standard. The results are summarized in Table 4. Lower Mooney viscosity indicates less oxidative crosslinking due to better processing stability.

TABLE 4

| Example | Processing Stabilizer | Mooney viscosity MS1 + 4(100) |
|---|---|---|
| 2a[a)] | 2.0 parts of Vulkanox 4020[d)] | 70 |
| 2b[b)] | 0.5 parts of Irganox 1520[c)] | 44 |

See explanation of footnotes at the end of Table 9.

EXAMPLE 3

Preparation of an EPDM Carbon Black Masterbatch

To produce the masterbatch, 100 parts of EPDM are mixed with 70 parts or carbon black N 550 in a Brabender laboratory mixer with cam blade rotors at 180° C. and 45 rpm. The processing stabilizers are added at the start of the mixing process. An increase of the torque during mixing indicates oxidative crosslinking due to shear forces, high temperature and oxygen. The induction time, i.e. the mixing time until the torque raises by one Nm after massing a minimum/equilibrium, is a good indication of the processing stability or the performance of a processing stabilizer system. Longer induction time indicates better stability. The results are summarized in Table 5.

TABLE 5

| Example | Processing Stabilizer | Induction time (min) |
|---|---|---|
| 3a[a)] | None | 0.5 |
| 3b[a)] | 1.0% of Irganox HP 2225[e)] | 5.5 |
| 3c[b)] | 0.5% of Irganox 1520[c)] | 8.5 |
| 3d[b)] | 1.0% of Irganox 1520[c)] | >30 |

See explanation of footnotes at the end of Table 9.

EXAMPLE 4

Smooth Processing of Damaged Rubber Using Optimized Processing Stabilizers

Damaged rubber cannot be regenerated on a large scale through post addition of anti-degradants. Therefore tests are performed to ascertain whether the addition of anti-ageing agents at the beginning of the mixing process can prevent oxidation crosslinking of damaged rubber. For this purpose, commercially stabilized low-cis polybutadiene is first aged at 70° C. for up to three weeks. The processing stability and the performance of processing stabilizer systems is determined by measuring the induction time in a Brabender mixer at 150° C. and a rotor speed of 45 rpm. The results are summarized in Table 6. A longer the induction time indicates a better processing stability.

TABLE 6

| Example | Processing Stabilizer | Induction time (min) |
|---|---|---|
| 4a[a)] | None | 3 |
| 4b[a)] | 2.0% of Vulkanox 4020[d)] | 6.6 |
| 4c[a)] | 0.3% of Irganox 1076[i)]<br>0.6% of Irganox PS 800[j)] | 5.2 |
| 4d[b)] | 0.2% of Irganox 1520[e)] | >60 |

See explanation of footnotes at the end of Table 9.

EXAMPLE 5

Preparation of an EPDM Carbon Black Masterbatch

To produce the masterbatch, 100 parts of EPDM are mixed with 70 parts or carbon black N 550 in a Brabender laboratory mixer with cam blade rotors at 180° C. and 45 rpm. The processing stabilizers are added at the start of the mixing process. Oxidative crosslinking of the rubber chains can occur during mixing due to shear forces, high temperature and oxygen. This results in an increase of the viscosity of the EPDM carbon black masterbatch. Lower viscosity, expressed as Mooney viscosity unites MS 1+4(100) according to corresponding ASTM standard, indicates better stability. The results are summarized in Table 7.

TABLE 7

| Example | Processing Stabilizer | Mooney viscosity MA1 + 4(100) |
|---|---|---|
| 5a[a)] | None | >200 |
| 5b[a)] | 1.0% Flectol H[k)] | >200 |
| 5c[a)] | 1.0% Vulkanox 4020[d)] | >200 |
| 5d[b)] | 1.0% EB 51-677[l)] | 143 |

See explanation of footnotes at the end of Table 9.

EXAMPLE 6

Preparation of a Carbon Black Filled Rubber Compound at High Mixing Temperature If rubber compounds are mixed at high temperature good processing stability is essential to avoid oxidative crosslinking which results in viscosity increase and therefore to problems in the subsequent production steps. The use of a suitable processing stabilizer system protects the rubber and reduces the viscosity increase.

Recipe (see Table 8):

TABLE 8

| Rubber/Component | Parts by weight | Type of Chemical | Supplier |
|---|---|---|---|
| NR SMR CV 60 | 50 | Natural Rubber | |
| BR Buna CB 24 | 50 | Rubber | Lanxess |
| Ingralen 450 | 5 | Extender oil | Fuchs/Mannheim |
| Carbon black N 550 | 50 | Filler | |
| Zinc oxide | 3.0 | Activator | |
| Stearic acid | 1.0 | Activator | |

The ingredients are mixed in the usual manner in a Brabender laboratory mixer using cam blade mixers. In the Example according to the invention additionally 1.0 part by weight of a processing stabilizer is added. The mixer temperature is 180° C., the rotor speed 45 rpm, and the total mixing time 6 minutes. The Mooney viscosity ML1+4(100) of the basic mixtures is measured according to the corresponding ASTM Standard. Lower Mooney viscosity indicates less oxidative crosslinking due to better processing stability. The results are summarized in Table 9.

TABLE 9

| Example | Processing Stabilizer | Mooney viscosity MA1 + 4(100) |
|---|---|---|
| 6a[a)] | None | 72 |
| 6b[a)] | 1.0% Vulkanox 4020[d)] | 72 |
| 6c[b)] | 1.0% EB 51-667[l)] | 67 |
| 6d[b)] | 0.5% EP 51-677[l)]<br>0.5% TEMPO[m)] | 62 | a) Comparison Example.
b) Example according to the invention.
c) Irganox 1520® [Ciba Specialty Chemicals Inc.] is a compound of the formula A

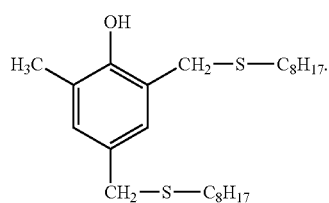

d) Vulkanox 4020® [Bayer] is 4-[1,3-dimethylbutyl]amino-diphenylamine of the formula B

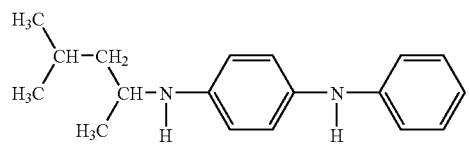

e) Irganox HP 2225® [Ciba Specialty Chemicals Inc.] is a mixture of 15% of HP 136[f)] and 85% of Irganox B 225 [mixture of 50% Irgafos 168[g)] and 50% Irganox 1010[h)]].
f) HP 136® is a mixture of 3-(3,4-dimethylphenyl)-5,7-di-tert-butylbenzofuran-2-one and 3-(2,3-dimethylphenyl)-5,7-di-tert-butylbenzofuran-2-one.
g) Irgafos 168® is tris(2,4-di-tert-butylphenyl) phosphite.

h) Irganox 1010® is a compound of the formula C.

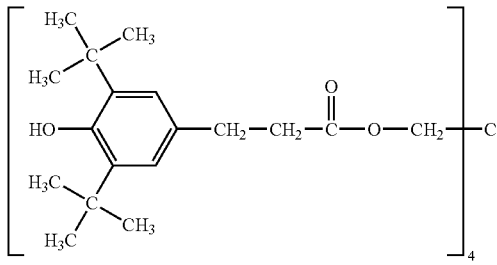

Irganox 1076® is a compound of the formula D

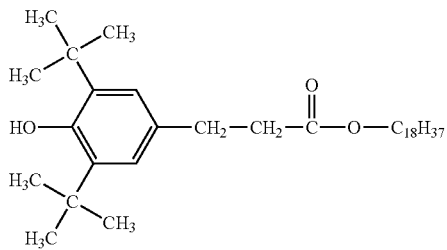

j) Irganox PS 800® is a compound of the formula E

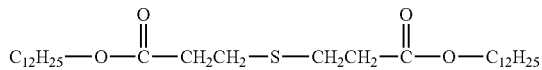

k) Flectol H® is a polymerized 1,2-dihydro-2,2,4-trimethyl-chinoline.
l) EB 51-677 is a mixture of 98.25% of IRGANOX 1520®[c] and 1.75% of Irgaplast 392® which is an epoxidized soybean oil.
m) TEMPO is 2,2,6,6-tetramethylpiperidine-1-oxyl (free radical).

What is claimed is:

1. An improved method for the preparation of rubber compounds which comprises compounding rubber, epoxidised soybean oil and 2,2,6,6-tetramethylpiperidine-1-oxy at 125-200° C. in the presence of an amount of 0.1-2%, based on the weight of the rubber, of a processing stabilizer of the formula I

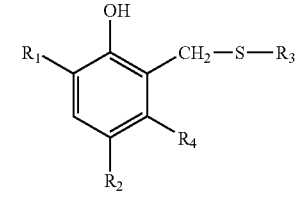

wherein
$R_1$ is hydrogen, $C_1$-$C_{20}$alkyl, styryl, α-methyl-styryl or —$CH_2$—S—$R_3$; or $C_1$-$C_{20}$alkyl substituted with $C_2$-$C_{20}$alkenyl, $C_3$-$C_{20}$alkinyl, $C_5$-$C_9$cycloalkyl, phenyl or tolyl;
$R_2$ is $C_1$-$C_{20}$alkyl or —$CH_2$—S—$R_3$,
$R_3$ is $C_1$-$C_{20}$alkyl; $C_1$-$C_{20}$alkyl substituted with phenyl, hydroxyl, cyano, formyl, acetyl or —O—CO—$R_5$; $C_2$-$C_{20}$alkenyl, $C_3$-$C_{20}$alkinyl, $C_5$-$C_9$cycloalkyl; or $C_5$-$C_9$cycloalkyl substituted with hydroxyl, phenyl, 4-chlorophenyl, 2-methoxycarbonylphenyl, p-tolyl, 1,3-benzthiazol-2-yl, —$(CHR_5)_n COOR_6$ or —$(CHR_5)_n CONR_7 R_8$;
$R_4$ is hydrogen or methyl,
$R_5$ is hydrogen or $C_1$-$C_6$alkyl,
$R_6$ is $C_1$-$C_{20}$alkyl; $C_3$-$C_{20}$alkyl interrupted with oxygen or sulfur; $C_5$-$C_9$cycloalkyl, phenyl, benzyl or tolyl,
$R_7$ and $R_8$ are independently of each other hydrogen or $C_1$-$C_6$alkyl, and
n is 1 or 2,
where the weight ratio of the stabilizer of formula I to the epoxidised soybean oil is from 99.5:0.5 to 10:90 and where the weight ratio of the stabilizer of formula I to 2,2,6,6-tetramethylpiperidine-1-oxyl is from 2:1 to 1:2.

2. A method according to claim 1, wherein $R_3$ is $C_6$-$C_{18}$alkyl.

3. A method according to claim 1, wherein
$R_1$ is methyl,
$R_2$ is —$CH_2$—S—$R_3$,
$R_3$ is $C_8$-$C_{12}$alkyl, and
$R_4$ is hydrogen.

4. A method according to claim 1, comprising compounding further components selected from the group consisting of pigments, dyes, fillers, levelling assistants, dispersants, plasticizers, vulcanization activators, vulcanization accelerators, vulcanizers, charge control agents, adhesion promoters, antistatic agents, metal oxides, antioxidants and light stabilizers.

5. A method according to claim 1, wherein the compounding takes place at 150-200° C.

* * * * *